Aug. 10, 1965 W. KOBER 3,200,277
TEMPERATURE COMPENSATING MOUNTING FOR DYNAMOS
Filed Nov. 27, 1961 2 Sheets-Sheet 1

INVENTOR.
WILLIAM KOBER
BY
Christel & Bean
ATTORNEYS

Aug. 10, 1965
W. KOBER
3,200,277
TEMPERATURE COMPENSATING MOUNTING FOR DYNAMOS
Filed Nov. 27, 1961
2 Sheets-Sheet 2
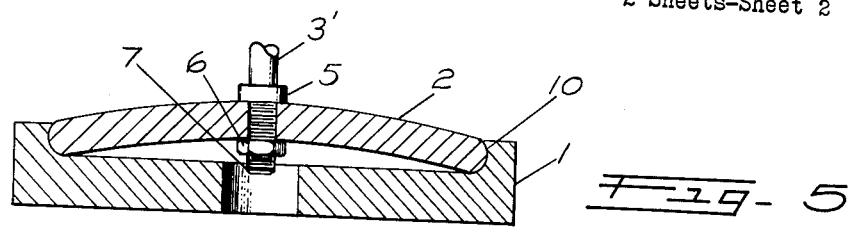
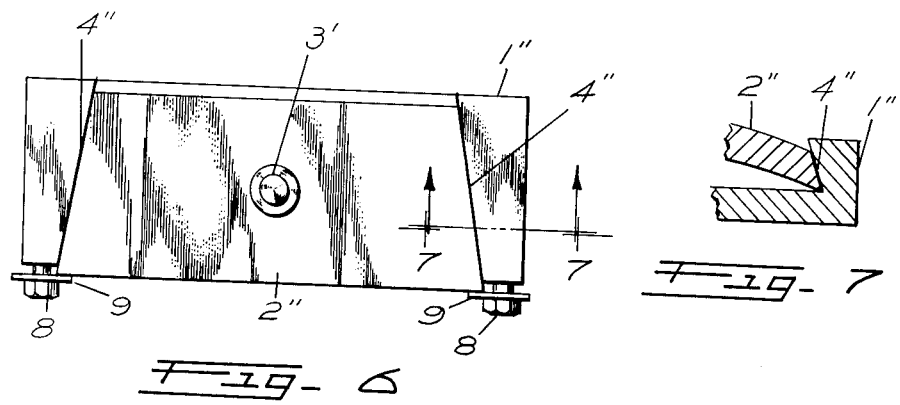
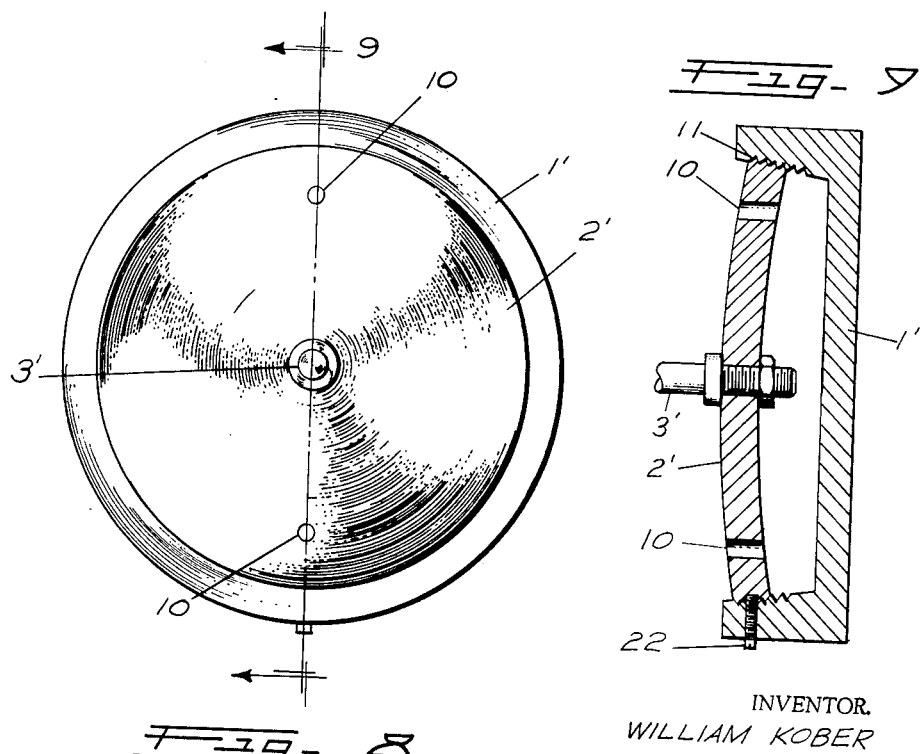
INVENTOR.
WILLIAM KOBER
BY
Christel & Bean
ATTORNEYS

United States Patent Office 3,200,277
Patented Aug. 10, 1965

3,200,277
TEMPERATURE COMPENSATING MOUNTING
FOR DYNAMOS
William Kober, Fairport, N.Y., assignor, by mesne assignments, to The Garrett Corporation, Los Angeles, Calif., a corporation of California
Filed Nov. 27, 1961, Ser. No. 155,094
16 Claims. (Cl. 310—209)

This invention relates to a new and useful temperature compensating assembly particularly adapted for mounting a dynamo rotor or stator for movement lengthwise of the rotor shaft.

The magnetic field produced in a dynamo will vary with variations in temperature. In a permanent magnet generator, for example, the temperature coefficient of the magnet material will cause a loss of flux, and consequent reduction in generated voltage, as the temperature increases. Temperature changes result from variations in the temperature of the ambient atmosphere, from mere warming up of the dynamo, and from other factors, and are largely unavoidable as a practical matter. Therefore, it is desired to compensate for loss of flux, and voltage drop, due to such temperature changes.

In dynamos of the axial air gap type, in which the stator and rotor have parallel working faces spaced apart axially of the rotor shaft, such flux change can be compensated for by varying the length of the air gap. This can be accomplished by shifting either the rotor or the stator, relative to the other, along the axis of rotor rotation.

Such shifting can be produced by a bimetal device. However, if considerable deflection and axial movement are desired, over a moderate temperature range, either a long bimetal arm or a very thin one must be used. Either alternative has the disadvantage of also producing considerable flexibility under varying loads. This cannot be tolerated and while such flexibility can be overcome by building up a stack of thin bimetal pieces, this is not the best solution for many reasons.

The primary object of my invention is to provide a temperature compensating mounting assembly, for dynamos, which will produce considerable deflection over a moderate temperature range and which is extremely stiff and resistant to deflection under large loading.

Another object of my invention is to provide a temperature compensating mounting assembly which can be made from a far greater variety of materials than can be used in bimetal devices, and which avoids any necessity for surface bonding as required in bimetal devices.

Still another object of my invention is to provide a temperature compensating mounting assembly which also provides means for adjusting the initial setting of the air gap.

In addition, it is an object of my invention to provide a temperature compensating mounting which can utilize existing dynamo parts and structures as part of the mounting assembly.

In one aspect thereof, a temperature compensating mounting assembly for dynamos constructed in accordance with my invention is characterized by the provision of a body part, a beam part mounted on the body part, the beam part having a higher coefficient of thermal expansion than the body part and being held by the body part at opposed end portions of the beam part for deflection of the intermediate portion of the beam part relative to the body part, and means for connecting one of the parts to a dynamo rotor or stator for movement thereof along the axis of rotor rotation upon such relative deflection.

In another aspect thereof, a temperature compensating assembly for dynamos constructed in accordance with my invention is characterized by the provision of a first part, a second part, and means mounting one of the parts on the other, the mounting means springing the one part in a manner deflecting the center of the one part relative to the other part, the parts having different coefficients of thermal expansion and being adapted for connection to a stator or rotor to shift the same along the axis of rotor rotation upon changes in relative deflection.

The foregoing and other objects, advantages and characterizing features of my invention will become clearly apparent from the ensuing detailed description of certain presently contemplated embodiments thereof, considered in conjunction with the accompanying drawings wherein like reference numerals denote like parts throughout the various views and wherein:

FIG. 5 is a transverse sectional view through another form of temperature compensating mounting assembly of my invention.

FIG. 6 is a plan view of still another form thereof;

FIG. 7 is a fragmentary sectional view thereof, taken about on line 7—7 of FIG. 6;

FIG. 8 is a plan view of still another form of my invention; and

FIG. 9 is a transverse sectional view thereof, taken about on line 9—9 of FIG. 8.

In brief, I use a solid beam mounted so as to buckle with temperature variations. This has the advantage, among others, over stacked bimetal pieces that the rigidity of a solid beam varies as the cube of the thickness, whereas the rigidity of stacked bimetal pieces of the same thickness increases only in proportion to the number of layers. While the detailed disclosure which follows makes reference primarily to the mounting of a dynamo rotor on its shaft, it will be appreciated that the temperature compensating device of my invention can equally well be used to mount the stator, and could even be used elsewhere than in dynamos.

Figure 1:
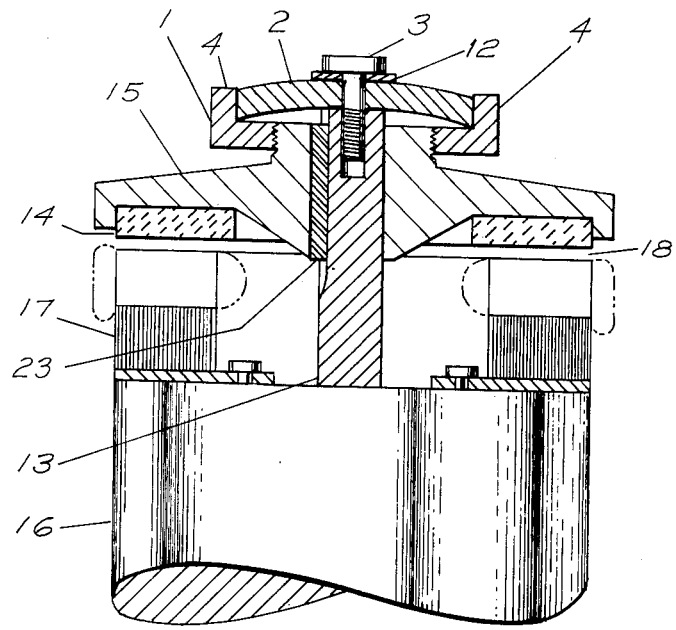
FIG. 1 is a longitudinal sectional view of a dynamo incorporating a temperature compensating mounting assembly of my invention, parts being broken away for ease of illustration.

FIG. 1 shows a complete system using a temperature compensating device of my invention. An electric motor 16 has a shaft 13 which drives the rotor 15 of a permanent magnet axial air gap generator. The stator 17 of the generator is mounted on the motor. The magnet material 14 comprises a ceramic, annular magnet, and has a temperature coefficient of flux causing it to lose flux, with consequent lowering of generated voltage, as temperature increases. Temperature changes can be due to changes in ambient temperature, to warm up after starting, etc., and are unavoidable. However, if the air gap 18 of the generator is reduced as temperature increases, the flux drop can be compensated for, or undercompensated, or even overcompensated, as may be desired. This variation in air gap length is accomplished as follows.

Rotor body 15 is mounted on shaft 13, using a key 23 and its keyway whereby the rotor can slide endwise on the shaft but must turn with the shaft. The axial position of rotor 15 on shaft 13 is determined by the temperature compensating mounting comprising bodies 1 and 2. Body 1 comprises a body part, and is made of a material having a relatively low temperature coefficient of expansion, such as steel, invar, or a ceramic. Body 2 comprises a beam part, and is made of a material having a relatively high coefficient of expansion, such as aluminum alloy, brass or magnesium alloy. Beam part 2 is forced between shoulders 4 on body part 1, with which it has an interference fit, and is thereby sprung between its ends. Body part 1 is secured to rotor 15 by threads, or other axial position adjusting means. In this way, the voltage level of the generator can be set by turning the mounting assembly 1, 2 on shaft 13 until the desired air gap and voltage under given temperature conditions is obtained. The center of body 2 bears against the end of shaft 13, and is held there by the pull of the magnet on the stator. To prevent the mounting device 1, 2 from turning on the threads on rotor body 15 once the desired initial position of rotor 15 is obtained, nut 3 and lock washer 12 are provided. Nut 3 goes through a central hole in body 2 and threads into the shaft 13.

When the temperature changes, the relative lengths of beam part 2, and body part 1 between shoulders 4 change. The difference is accommodated in part in two ways. First, body part 1 stretches between shoulders 4 in simple tension, and beam part 2 is shrunk in simple compression. Second, and most important, beam part 2 changes its curvature, causing its center to move outward relative to body part 1. When, as here, beam part 1 is fixed mechanically at its center, motion of body part is produced.

Since the mounting assembly is in metallic contact with rotor body 15, it follows the temperature of magnet 14 closely, and so compensates well even when the temperature, as at warmup, is changing rapidly. As the temperature rises, beam part 2 increases curvature, causing body part 1 and the entire rotor to move to the left, thereby decreasing the air gap. This compensates for the loss of flux due to the temperature coefficient of the magnet. When the temperature drops, the entire action is reversed. In this way, and by properly selecting parts 1 and 2, loss of flux due to temperature variations can be compensated for, or either overcompensated or undercompensated if desired.

The above described structure is capable of giving relatively large thermal motions with great rigidity. To show this, and to obtain a better understanding of the operation of the invention, the following theoretical analysis is given.

Figure 3:
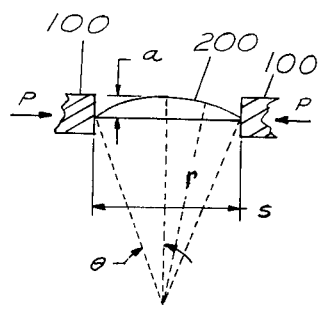
FIG. 3 is a schematic view illustrating the mode of operation of my invention.

FIG. 3 shows a thin springy wire 200, initially straight, buckled between walls 100. According to well known beam theory, the bending moment is the same at all points on wire 200, being in fact $p.a$ at all points where "$a$" is the deflection of wire 200 at its center. Wire 200 is assumed to pivot freely at its ends on wall surfaces 100, and is thus pivot ended. Under these conditions, as is known from the theory of beams, wire 200 will become an arc of a circle.

Thus, from FIG. 3, if $S_0$ is the original length of the wire, $$2r\theta = S_0 = \text{constant} \qquad (1)$$

$$S = 2r \sin \theta \qquad (2)$$

$$a = r(1 - \cos \theta) \qquad (3)$$

$$S_0 - S = 2r(\theta - \sin \theta) \qquad (4)$$

In the region of interest, $\theta$ is small, and the first two terms of the sin and cos expansion will be nearly accurate. Thus approximately:

$$\cos \theta \doteq 1 - \frac{\theta^2}{2} \qquad (5)$$

$$\sin \theta \doteq \theta - \frac{\theta^3}{6} \qquad (6)$$

and $$a \doteq r\frac{\theta^2}{2} \qquad (7)$$

$$S_0 - S \doteq r\frac{\theta^3}{3} \qquad (8)$$

then $$a^2 \doteq \frac{r^2\theta^4}{4} \doteq \frac{S_0 r \theta^3}{2.4} \doteq \tfrac{3}{8} S_0 (S_0 - S) \qquad (9)$$

Now $S_0 - S$ is the change in distance between end surfaces 4 from the original distance $S_0$ for the straight wire, and this change now will be called "$X$." Thus $$a^2 \doteq \tfrac{3}{8} S_0 X \doteq \tfrac{3}{8} SX \qquad (10)$$

since there is very little percentage difference between $S$ and $S_0$.

Now "$X$" and "$a$" describe the initial curve of body 2 built into the unit. We are really interested in the rate at which "$a$" changes with "$X$" about a given configuration. This is, of course $da/dx$, and differentiating, $$2a\,da = \tfrac{3}{8} S_0 d \qquad (11)$$

$$da/dx = \tfrac{3}{16} S_0 / a \qquad (12)$$

It will thus be seen that the motion $da$ is amplified from "$X$," the linear expansion differential of the bodies 1 and 2, by the factor $$\tfrac{3}{16} S_0 / a$$

thus, the smaller the deflection "$a$" at the working point, the greater the ratio $S_0/a$ and the greater the amplification. This condition is the basic source of the relatively large motions available from the invention.

The rigidity, or deflection per unit loading force is at least that of body 2 as a beam loaded at its center. In addition to this, added stiffness results from the action of the bodies 1 and 2 as a truss.

The bodies 1 and 2 are normally chosen of quite substantial thickness. In fact, in many cases body 1 may be part of an already existing mass of metal, such as a casting on an exhaust manifold. Body 2 is a simple bar of, for example, aluminum, and no problem exists as to availability, fabrication or cost.

As was stated before, part of the thermal forces developed may be into simple compression of body 2 and elongation of body 1. It is naturally worth while to minimize these effects, and secure maximum action to deflect body 2. One direct means of accomplishing this is to make body 1 of very heavy section between shoulders 4, thus insuring that the loads produced give very little elastic motion in body 1. This device is usually practical. Body 1 can increase in thickness toward its center, the thickness being accommodated by the sprung or bowed condition of beam part 2.

For beam part 2, if the beam factor (length/radius of gyration) is large, the compressive loads will not vary much over the working range. This, however, tends to reduce rigidity, although it is still relatively high. A better method is to produce beam part 2 so that it is relatively straight when free, and is held in deflected position by its initial end loading against shoulders 4. This produces an "Euler Column" effect in beam part 2, so that the endwise force is substantially constant over a large range of deflections. To enlarge somewhat on this factor, suppose part 2 to be a beam supported at its ends and loaded in the middle. The deflection will be proportional to the load, or more exactly, to the moment of the load. If now, the beam is sprung between its ends with a curve producing a center deflection from straightness of "$a$," the bending moment will be the end force $p$ times $a$. Thus, the beam has a bending moment and hence deflection both proportional to the end load times "$a$," so that the end load is substantially constant over a large range of deflections. This constant end load will cause no change in the pure compressive or tensile stresses in bodies 2 and 1, respectively, and hence avoids loss of motion. Although in practice, it is often advisable to form body 2 with an initial curvature, the above considerations are of importance to the efficiency of the structure, particularly when the section of body 1 is limited.

The springing of beam 2 between shoulders 4 may be done by heating part 1 and cooling part 2 until they have changed enough to permit a push fit into assembly. On returning to equal temperatures, the pressure of beam part 2 against the shoulders 4 of body part 1 builds up, causing part 2 to curve as shown. Another method of assembling parts 1 and 2 is to press down on both ends of part 2, but not near the center, while pressing up against the center of beam 2. This bends part 2 until its curve is greater than it is in working position, and shortens the distance between its ends so that it fits readily into position in body part 1. The beam is then released.

Figure 2:
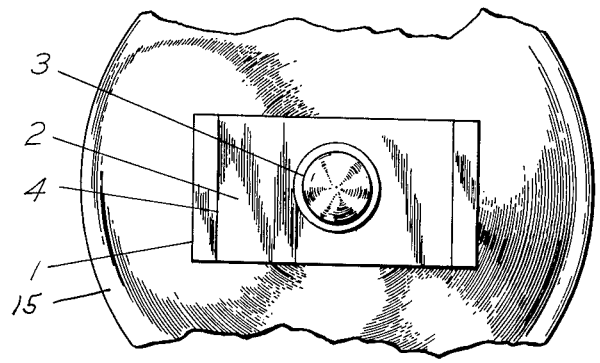
FIG. 2 is an end elevation thereof, parts being broken away for ease of illustration.
Figure 4:
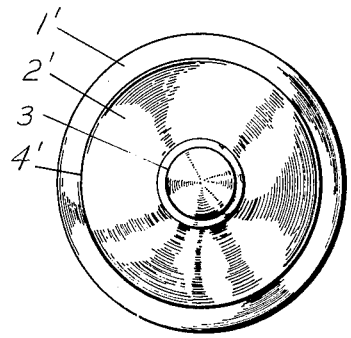
FIG. 4 is a view, on a reduced scale, corresponding to the end elevation of FIG. 2 but showing a modified construction.

FIG. 4 shows that neither the beam part nor the body part need be rectangular, as in FIG. 1, but can be circular. In this device, circular beam part 2' is sprung within annular shoulder 4' on circular body part 1'. The circular structure is easily fabricated, and because of its large effective beam width gives great rigidity.

FIG. 5 shows a structure similar to FIG. 1. Here, a loading rod 3' is fastened to the center of beam 2 by a shoulder 5, and nut 6 on threaded end 7. In this instance, the body part 1 could be fixed and the beam part 2 connected to the movable member (not shown) through rod 3'. The ends of beam 2 are rounded, and fit in rounded shoulders 10 of body 1. This gives more reliability under tensile loads on the system. It also produces a freer pivot-end beam action than FIG. 1, and so is more efficient.

In FIG. 6, body 1" has its shoulders 4" tapered, and beam 2", similarly tapered, is wedged into position to a proper deflection constant. Thus, this form gives an adjustable deflection, remembering Equation 12. The shoulders 4" may be either flat as in FIG. 1, tapered as in FIG. 7, or rounded as at 10 in FIG. 5. If the taper 4 is slow, beam 2" will remain in place by friction. To insure its remaining in position where heavy shock and vibration are encountered, bolts 8, threaded into body 1", can hold beam 2" in position under washers 9, or the washers can be replaced by a single strap extending across beam 2" with properly spaced holes or slots for bolts 8.

FIGS. 8 and 9 show two views of a circular assembly, in which bodies 1 and 2 have tapered threads 11 in engagement. As body 2 is moved into the taper, using pin holes 10 for driving purposes, the buckle curve of body 2 and thus its sensitivity can be controlled. The position desired may be locked in by set screw 22, if heavy vibration is to be encountered, or by a pin.

It will be noted that the temperature compensating device of the invention here has another function as well, namely the initial setting of the air gap. Also, it is customarily possible to combine the structures of the invention with already existing parts and functions, and this is a notable advantage of the invention.

In the foregoing, body part 1 has been designated as the material with the smaller temperature coefficient, and beam part 2 of the larger. This has been only for convenience in explanation. If the temperature coefficients are reversed, with 1 the larger and 2 the smaller, the function continues, only the motion produced is, of course, the reverse of that given.

In practical application, the size of parts and temperature range is such that "$a$," Equation 12, does not change by a large percentage, and the motion produced by the device of the invention is substantially linear, or in proportion to temperature. However, when desired, "$a$" can be designed small so that a desired non-linearity is produced, rate of motion being inversely proportioned to "$a$." When body 1 has a lower temperature coefficient than 2, motion will slow up as temperature rises and "$a$" increases. When body 1 has the higher temperature coefficient, motion will speed up as temperature rises.

Accordingly, it is seen that my invention fully accomplishes its intended objects. The foregoing detailed disclosure is given by way of illustration only, without thought of limitation, and it is my intention to include within the scope of the appended claims all such variations and modifications as will readily occur to those skilled in the art.

Having fully disclosed and completely described my invention, and its mode of operation, what I claim as new is:

1. A temperature compensating mounting assembly for dynamo rotors and stators comprising a body part having opposed shoulder portions, and a beam part engaging said shoulder portions and sprung therebetween, said parts having different coefficients of thermal expansion, means for connecting one of said parts to a dynamo rotor or stator for movement therewith, and means for connecting the other of said parts to a portion of a dynamo held against such movement.

2. A temperature compensating mounting assembly as set forth in claim 1, wherein said beam part comprises an elongated beam member.

3. A temperature compensating mounting assembly as set forth in claim 1, wherein said beam part is generally circular in outline.

4. A temperature compensating mounting assembly as set forth in claim 1, wherein the portions of said beam part engaging said shoulder portions are rounded in the direction of deflection of said beam part, and said shoulder portions are correspondingly rounded to mate with said rounded beam portions.

5. A temperature compensating mounting assembly as set forth in claim 1, wherein said beam part comprises an elongated beam member, and wherein said shoulder portions and said beam portions are tapered transversely of said beam member, said beam portions being wedged against said shoulder portions.

6. A temperature compensating mounting assembly as set forth in claim 1, wherein said shoulder portions and said beam portions are tapered in the direction of deflection of said beam part.

7. A temperature compensating mounting assembly as set forth in claim 1, wherein said shoulder portions and said beam portions are threaded.

8. A temperature compensating mounting assembly as set forth in claim 7, wherein said threaded shoulder and beam portions are tapered in the direction of deflection of said beam part.

9. A temperature compensating assembly for mounting either a dynamo rotor element or a dynamo stator element for movement along the axis of rotor rotation comprising a first body part having opposed shoulder portions, a second body part extending between said shoulder portions and having a force fit therewith, said second body part being sprung between said shoulder portions and maintained thereby in outwardly bowed relation to said first body part, said first and second body parts having different coefficients of thermal expansion, one of said body parts being fixed to said dynamo element for movement therewith, the other of said body parts being connected to a relatively fixed dynamo portion.

10. A temperature compensating assembly for mounting a dynamo element for movement along the axis of rotor rotation comprising a body part, a beam part fixed at its ends to said body part for movement therewith, said beam part being sprung between its ends and having a coefficient of thermal expansion different from that of said body part, and means for connecting one of said parts to a dynamo element for movement therewith along the axis of rotor rotation in response to a variation in deflection of said beam part relative to said body part.

11. In a dynamo having a rotatable shaft and a rotor mounted on said shaft for rotation therewith and movement therealong, a temperature compensating assembly controlling movement of said rotor along said shaft comprising a body part having opposed shoulder portions, and a beam part sprung between said shoulder portions and having a different coefficient of thermal expansion than said body part, means connecting one of said parts to said rotor for movement therewith, and means connecting the other of said parts to said shaft for movement therewith.

12. A dynamo construction as set forth in claim 11, wherein said means connecting said one part to said rotor are adjustable, thereby to selectively initially position said rotor axially of said shaft.

13. A temperature compensating assembly for dynamos comprising a body part, a beam part mounted on said body part, said beam part having a higher coefficient of thermal expansion than said body part and being held by said body part at opposed end portions of said beam part for deflection of the intermediate portion of said beam part relative to said body part, means for connecting one of said parts to a dynamo rotor or stator for movement therewith along the axis of rotor rotation, and means for mounting the other of said parts for producing such axial movement upon deflection of said beam portion.

14. A temperature compensating mounting assembly as set forth in claim 13, wherein said beam part comprises an elongated beam part held at its opposite ends by said body part.

15. A temperature compensating mounting assembly as set forth in claim 13, wherein said beam part is circular in outline and is held around its periphery by said body part.

16. A temperature compensating assembly for mounting a dynamo rotor or stator for movement along the axis of rotor rotation comprising a body part, a beam part mounted on said body part, said beam part having a different coefficient of thermal expansion than said body part and being held by said body part at opposed end portions of said beam part for deflection of the intermediate portion of said beam part relative to said body part, said beam part comprising an otherwise substantially flat member sprung between said end portions and maintained in such initially deflected condition by said body part.

References Cited by the Examiner

UNITED STATES PATENTS

| | | | |
|---|---|---|---|
| 1,847,251 | 3/32 | McKinley | 324—105 |
| 2,720,604 | 10/55 | Mitchel et al. | 324—105 |
| 2,761,080 | 8/56 | Akeley | 310—97 |

MILTON O. HIRSHFIELD, *Primary Examiner.*

DAVID X. SLINEY, *Examiner.*